US012591606B1

(12) United States Patent
Sengupta et al.

(10) Patent No.: US 12,591,606 B1
(45) Date of Patent: Mar. 31, 2026

(54) MACHINE LEARNING BASED DISAMBIGUATION IN A KNOWLEDGE AWARE CONVERSATION SYSTEM

(71) Applicant: INTUIT INC., Mountain View, CA (US)

(72) Inventors: Rachit Sengupta, San Diego, CA (US); John Patrick Symborski, Alberta (CA); Jianzhao Huang, Ontario (CA)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/984,213

(22) Filed: Dec. 17, 2024

(51) Int. Cl.
*G06N 20/00* (2019.01)
*G06F 16/00* (2019.01)
(Continued)

(52) U.S. Cl.
CPC .... *G06F 16/33295* (2025.01); *G06F 16/3329* (2019.01); *G06F 16/3344* (2019.01);
(Continued)

(58) Field of Classification Search
CPC .......... G06F 16/33295; G06F 16/3344; G06F 16/338; G06F 16/3329; G06F 40/30; G06F 40/20; G06F 40/40; G06F 40/35; H04L 51/216; G06N 5/022; G06N 5/04; G06N 5/046; G06N 20/00
See application file for complete search history.

(56) References Cited

U.S. PATENT DOCUMENTS 10,798,031 B1 * 10/2020 Chen ........................ G06F 40/56
11,907,673 B1 * 2/2024 Hao ......................... G06F 16/35
(Continued)

FOREIGN PATENT DOCUMENTS

WO WO2019217036 A1 * 11/2019
WO WO 2024191902 A1 * 9/2024

OTHER PUBLICATIONS

Haitian Sun et al., "Answering Ambiguous Questions with a Database of Questions, Answers, and Revisions", arXiv:2308.08661v1 [cs.CL] Aug. 16, 2023, pp. 1-9.*
(Continued)

*Primary Examiner* — Srirama Channavajjala
(74) *Attorney, Agent, or Firm* — Patterson + Sheridan, LLP

(57) ABSTRACT
Aspects of the present disclosure provide techniques for machine learning based disambiguation. Embodiments include receiving a query via a user interface; generating an enriched query by rewording the query based on conversation history data associated with the query. Embodiments include retrieving relevant information from a data store based on using an embedding of the enriched query to perform a semantic search. Embodiments include providing the enriched query and the relevant information to a language processing machine learning model along with a prompt that instructs the language processing machine learning model to generate an answer to the enriched query based on the relevant information and to generate a disambiguation question if one or more conditions are met. Embodiments include receiving an output from the language processing machine learning model in response to the prompt. Embodiments include providing a response to the query via the user interface based on the output.

15 Claims, 6 Drawing Sheets

(51) Int. Cl.

| | |
|---|---|
| *G06F 16/3329* | (2025.01) |
| *G06F 16/334* | (2025.01) |
| *G06F 16/338* | (2019.01) |
| *G06F 40/20* | (2020.01) |
| *G06F 40/30* | (2020.01) |
| *G06F 40/35* | (2020.01) |
| *G06F 40/40* | (2020.01) |
| *G06N 5/00* | (2023.01) |
| *G06N 5/022* | (2023.01) |
| *G06N 5/04* | (2023.01) |
| *G06N 5/046* | (2023.01) |

(52) U.S. Cl.
CPC ............ *G06F 16/338* (2019.01); *G06F 40/20* (2020.01); *G06F 40/30* (2020.01); *G06F 40/35* (2020.01); *G06F 40/40* (2020.01); *G06N 5/022* (2013.01); *G06N 5/04* (2013.01); *G06N 5/046* (2013.01); *G06N 20/00* (2019.01)

(56) References Cited

U.S. PATENT DOCUMENTS

| | | | |
|---|---|---|---|
| 12,099,503 B2 * | 9/2024 | Nagy | .................... G06F 16/215 |
| 2012/0016678 A1 * | 1/2012 | Gruber | ............... G06F 16/9537 |
| | | | 704/E21.001 |
| 2014/0122619 A1 * | 5/2014 | Duan | ...................... G06F 40/20 |
| | | | 709/206 |
| 2020/0342850 A1 * | 10/2020 | Vishnoi | ................. H04L 51/214 |
| 2021/0064932 A1 * | 3/2021 | Wang | ................. G06F 16/9024 |
| 2023/0244968 A1 * | 8/2023 | Gurin | .................. G06N 3/0475 |
| | | | 706/11 |
| 2024/0194180 A1 * | 6/2024 | Goldshtein | ............. H04L 51/02 |
| 2025/0124061 A1 * | 4/2025 | Edwards | ................. G06F 40/30 |

OTHER PUBLICATIONS

Rohan Parkar et al., "AI and Web-Based Interactive College Enquiry Chatbot", 2021 13th International Conference on Electronics, Computers and Artificial Intelligence (ECAI), Jul. 2021, pp. 1-5.*

* cited by examiner

200

QUERY REWRITING / HISTORY INTERPRETATION 122

USER QUERY
102

HISTORY
DATA
RETRIEVAL
COMPONENT
220

CONVERSATION
HISTORY DATA
STORE
230

CONVERSATION
HISTORY DATA
222

LANGUAGE
PROCESSING
MACHINE
LEARNING
MODEL
240

ENRICHED
QUERY
250

PROMPT
224

300

MACHINE LEARNING BASED RESPONSE GENERATION 124

ENRICHED
QUERY
250

CONTEXT
RETRIEVAL
COMPONENT
320

CONTEXT DATA
STORE
330

CONTEXT
322

LANGUAGE
PROCESSING
MACHINE
LEARNING
MODEL
340

ANSWER
342

DISAMBIGUATION
QUESTION
344

TOPIC CHANGE
INDICATOR
346

PROMPT
310

CONVERSATION
HISTORY DATA
222

400

AUTOMATED SUPPORT

| | |
|---|---|
| QUERY | How long has Peter Gerard been a user of FastFinance? |
| RESPONSE | Peter Gerard has been a user of FastFinance for 11 months. |
| QUERY | What is Peter Gerard's username? |
| RESPONSE | Peter Gerard's username for FastFinance is PGerard123. |
| QUERY | What is Peter Gerard's employer's tax ID? |
| RESPONSE | Are you asking about ABC Tech or Robins Self Storage? |
| QUERY | ABC Tech. |
| RESPONSE | Peter Gerard's employer ABC Tech has a tax ID of 52431. |

412
414
416
418
420
422
424
426

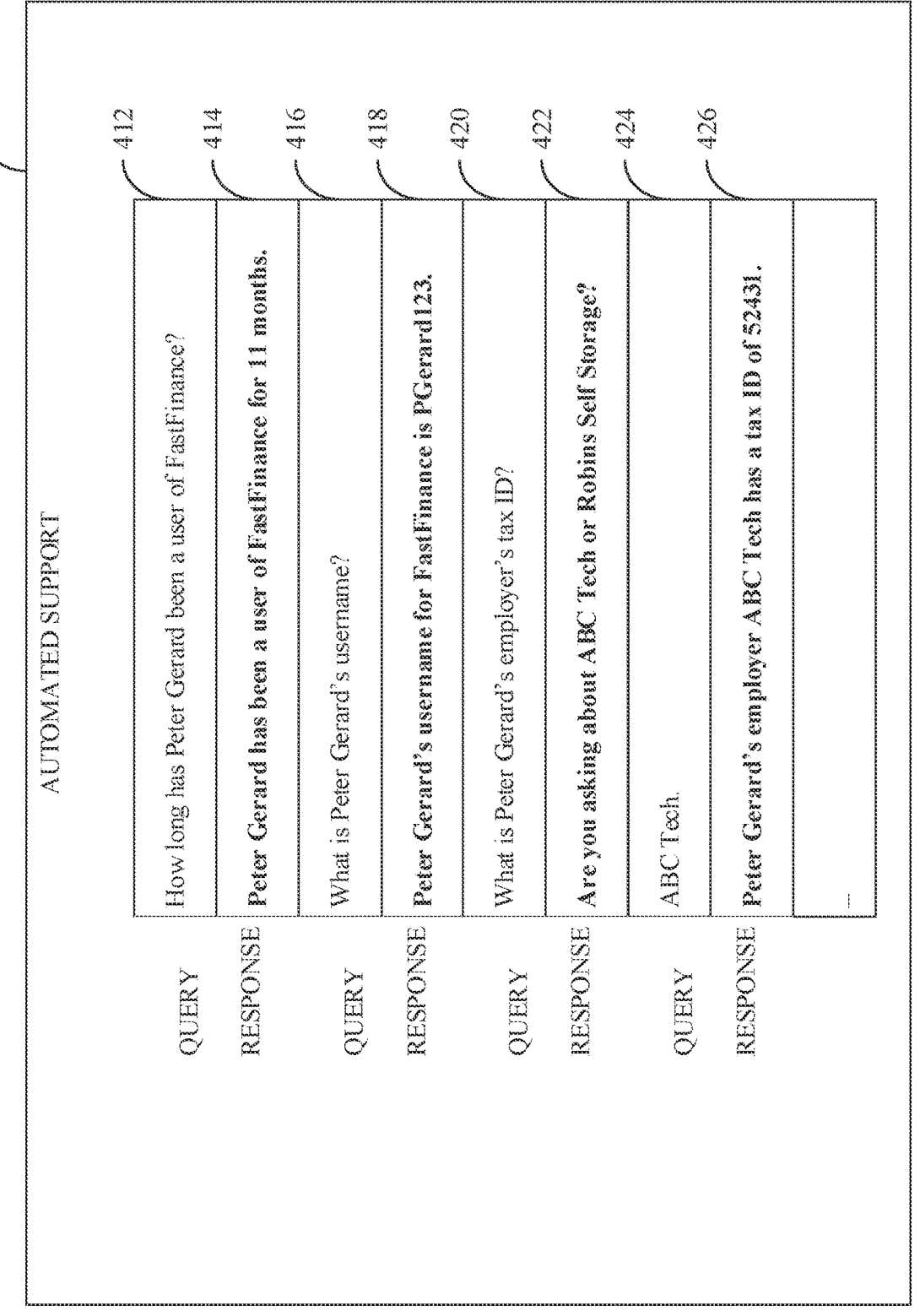

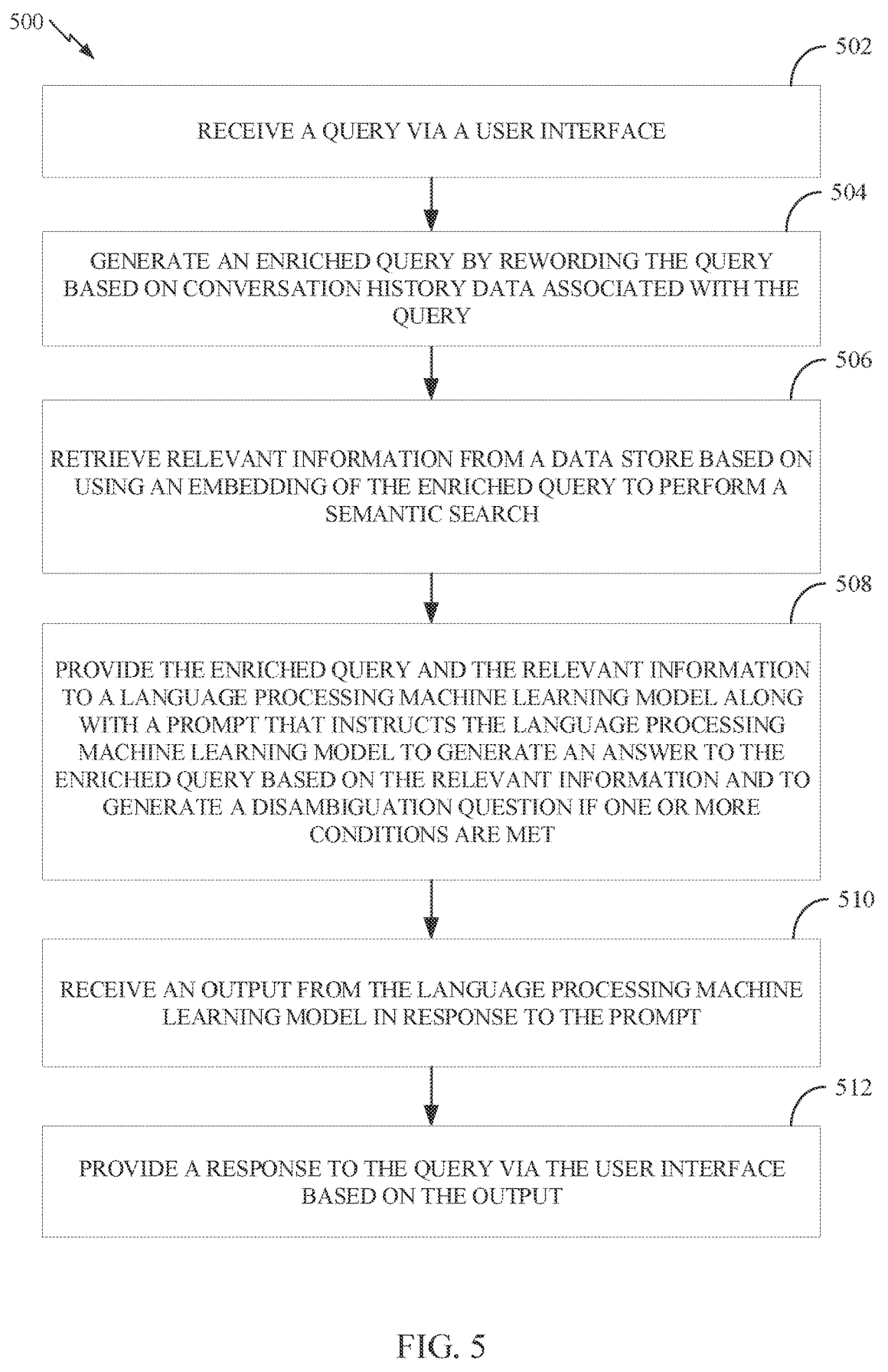

RECEIVE A QUERY VIA A USER INTERFACE

504

GENERATE AN ENRICHED QUERY BY REWORDING THE QUERY BASED ON CONVERSATION HISTORY DATA ASSOCIATED WITH THE QUERY

506

RETRIEVE RELEVANT INFORMATION FROM A DATA STORE BASED ON USING AN EMBEDDING OF THE ENRICHED QUERY TO PERFORM A SEMANTIC SEARCH

508

PROVIDE THE ENRICHED QUERY AND THE RELEVANT INFORMATION TO A LANGUAGE PROCESSING MACHINE LEARNING MODEL ALONG WITH A PROMPT THAT INSTRUCTS THE LANGUAGE PROCESSING MACHINE LEARNING MODEL TO GENERATE AN ANSWER TO THE ENRICHED QUERY BASED ON THE RELEVANT INFORMATION AND TO GENERATE A DISAMBIGUATION QUESTION IF ONE OR MORE CONDITIONS ARE MET

510

RECEIVE AN OUTPUT FROM THE LANGUAGE PROCESSING MACHINE LEARNING MODEL IN RESPONSE TO THE PROMPT

512

PROVIDE A RESPONSE TO THE QUERY VIA THE USER INTERFACE BASED ON THE OUTPUT

FIG. 5

MACHINE LEARNING BASED DISAMBIGUATION IN A KNOWLEDGE AWARE CONVERSATION SYSTEM

INTRODUCTION

Aspects of the present disclosure relate to techniques for automatically generating responses to queries in a disambiguated, context-aware manner using machine learning.

BACKGROUND

Every year millions of people, businesses, and organizations around the world utilize software applications to assist with countless aspects of life. Software applications typically perform actions and/or generate automated responses based on requests submitted by users, such as natural language queries and/or other forms of user input.

In many cases machine learning models may be used to automatically generate responses to user queries. However, user queries often lack context and/or specificity, and a machine learning model may misinterpret or fail to properly understand a particular query, and therefore may produce inaccurate or irrelevant responses. Furthermore, it is often challenging to determine what inputs should be provided to a machine learning model in connection with handling a request, such as determining which types of context information to include (e.g., due to ambiguities in the request and/or due to the large amount of potentially relevant context information that may be available). In many cases, providing an ambiguous request and/or a suboptimal set of context information (e.g., irrelevant, too little, too much, and/or the like) to a machine learning model can result in an incorrect response, inefficient processing, failure, and/or other suboptimal results.

As such, there is a need in the art for improved techniques of automatically generating responses to user queries in computing applications.

BRIEF SUMMARY

Certain embodiments provide a method for machine learning based disambiguation in a knowledge aware conversation system. The method generally includes: receiving a query via a user interface; generating an enriched query by rewording the query based on conversation history data associated with the query; retrieving relevant information from a data store based on using an embedding of the enriched query to perform a semantic search; providing the enriched query and the relevant information to a language processing machine learning model along with a prompt that instructs the language processing machine learning model to generate an answer to the enriched query based on the relevant information and to generate a disambiguation question if one or more conditions are met; receiving an output from the language processing machine learning model in response to the prompt; and providing a response to the query via the user interface based on the output.

Other embodiments comprise systems configured to perform the method set forth above as well as non-transitory computer-readable storage mediums comprising instructions for performing the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 is a diagram depicting an example user interface screen related to machine learning based disambiguation in a knowledge aware conversation system, according to certain embodiments.

FIG. 5 depicts example operations related to machine learning based disambiguation in a knowledge aware conversation system, according to certain embodiments.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
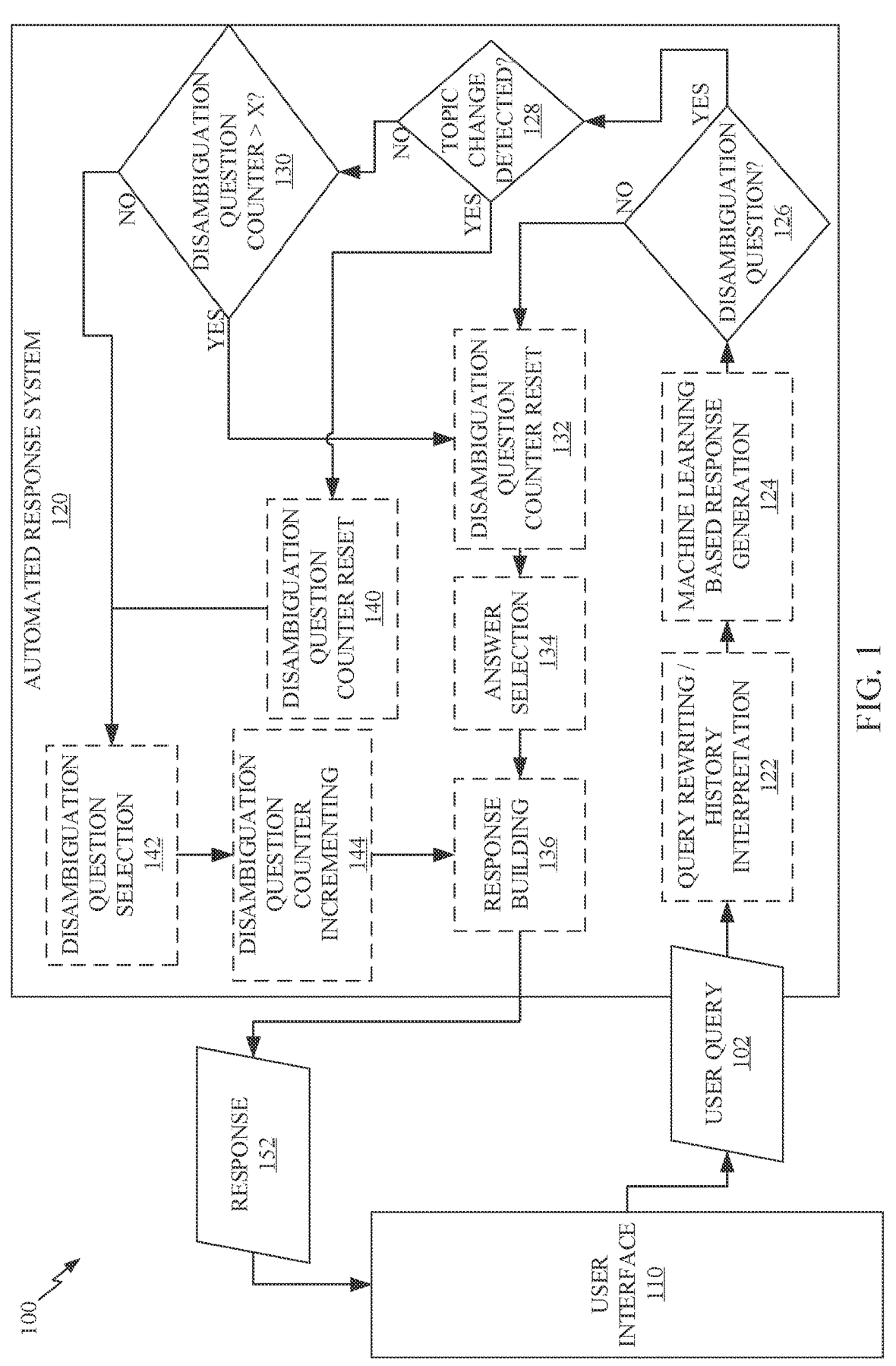
FIG. 1 is a diagram illustrating example computing components related to machine learning based disambiguation in a knowledge aware conversation system, according to certain embodiments.

Aspects of the present disclosure provide apparatuses, methods, processing systems, and computer-readable mediums for machine learning based disambiguation in a knowledge aware conversation system.

Computing applications may utilize various techniques, such as involving machine learning models, to automatically generate responses to requests from users. For example, a language processing machine learning model such as a large language model (LLM) may be used as part of an automated conversation system (e.g., a chat bot) to generate responses to natural language queries from users. Techniques described herein involve a dynamic approach in which user queries are automatically reworded in a context-enriched form to increase the understanding of such queries by a machine learning model and for use in retrieving relevant, focused context data to provide along with such enriched queries to a machine learning model. Furthermore, dynamic disambiguation logic may be employed in which a machine learning model is prompted to output a disambiguation question if ambiguity is detected in a user query, and counters and thresholds may be used to ensure that such disambiguation is performed in a resource-efficient and reasonably limited manner.

As described in more detail below with respect to FIGS. 1 and 2, a language processing machine learning model may be used to rewrite a user query into an enriched form based on conversation history related to the user query. Furthermore, as described with respect to FIGS. 1 and 3, the enriched query may be used to retrieve relevant context information, such as by comparing an embedding (e.g., vector representation) of the enriched query to embeddings of potentially relevant context information to determine embedding similarity. As explained with respect to FIG. 3, the enriched query, the retrieved relevant context information, and (in some embodiments) the conversation history data may be provided to a language processing machine learning model (e.g., the same model or a different mode than the model used to generate the enriched query) along with a prompt to generate a response to the enriched query based on the associated information and, if needed, to generate a disambiguation question. The model may also be prompted to output an indication of whether a topic change is detected in the enriched query as compared to a previous query. If a disambiguation question is output, it may be provided to the user if certain conditions are met, such as if fewer than a threshold number of disambiguation questions have been provided to the user without detection of a topic change. If the disambiguation question counter reaches the threshold without a topic change (e.g., indicating that the system may be stuck in a loop of disambiguation questions), the disambiguation question may be discarded and the generated answer (e.g., output by the model) may be provided to the user as a best guess answer. If a disambiguation question is provided to the user and a response is received from the user to the question, the response may be treated as a new user query and processed in a similar manner based on the conversation history (e.g., including the user query that resulted in the disambiguation question being generated) in order to generate an answer (and, if necessary, another disambiguation question). Thus, accurate and context-aware answers may be automatically generated and provided to users in a dynamic and resource efficient manner that is not possible with prior automated response systems.

Techniques described herein improve the technical field of automated response generation in computing applications in a number of ways. For instance, by automatically rewording a user query into an enriched form based on conversation history, such as using a language processing machine learning model, aspects of the present disclosure improve the ability of a machine learning model to understand and process the query, resulting in automated generation of responses that have a higher level of accuracy and relevance than would be possible if the query was provided in its original form to the machine learning model. Additionally, by utilizing the automatically generated enriched query to retrieve relevant context information, such as based on embedding similarity, techniques described herein enable the retrieval of context information that is more relevant and focused than would be retrieved based on the query in its original form, thereby enabling a machine learning model to be provided with a more targeted and applicable set of context information along with the enriched query, resulting in automatically generated answers that are more accurate, informed, and generated in a more resource-efficient manner.

Furthermore, using dynamic disambiguation logic to iteratively disambiguate user queries as appropriate in a context-aware feedback loop enables such user queries to be automatically answered in an accurate manner despite ambiguity and/or imprecision in such queries. Utilizing disambiguation question counters, thresholds, and automated topic change detection techniques to limit the number of disambiguation questions provided to a user in connection with a given topic further improves the resource-efficiency and effectiveness of techniques described herein as compared to prior techniques. By generating a bet guess answer even if a disambiguation question is generated, aspects of the present disclosure enable an automated disambiguation process to be exited at any time based on dynamically determined circumstances while still providing an automatically generated answer with a high probability of accuracy.

Example Computing Components Related to Machine Learning Based Disambiguation

FIG. 1 is a diagram 100 illustrating example computing components related to machine learning based disambiguation in a knowledge aware conversation system, according to certain embodiments.

In diagram 100, a user query 102 is received via a user interface 110. User interface 110 generally represents an interface through which one or more users interact with a computing application, such as displaying and/or otherwise outputting content and/or receiving input via one or more user interface elements and/or input devices. In one example, user interface 110 allows a user to provide natural language input, such as via text and/or audio, in order to request information and/or functionality provided by one or more computing applications. In one example, user interface 110 displays an interface of an automated conversation system, such as a chat bot. User interface 110 may also enable other types of input, such as selecting particular elements displayed in one or more screens.

User query 102 generally represents a natural language input from a user, such as asking a question, requesting particular information, requesting particular functionality, providing particular information, and/or the like.

An automated response system 120 may process user query 102, such as to automatically generate a response 152 to user query 102. Automated response system 120 generally represents one or more computing components, such as implemented via software executing on one or more computing devices, configured to process a user query and automatically generate a response in a dynamic, disambiguating, context-aware manner.

At query rewriting/history interpretation 122, user query 102 is automatically rewritten (e.g., reworded) into an enriched form based on conversation history data related to user query 102. For example, as described in more detail below with respect to FIG. 2, conversation history data comprising one or more prior requests and/or responses in a conversation associated with user query 102 may be retrieved and provided along with user query 102 to a machine learning model such as a language processing machine learning model. The language processing machine learning model may be prompted to generate an enriched query by rewording user query 102 in view of the conversation history data. For example, the conversation history data may include information that clarifies one or more ambiguities, inaccuracies, and/or otherwise imprecise aspects of user query 102, and the language processing machine learning model may use such clarifying information to generate an enriched query that is more contextually informed, more accurate, more precise, and/or less ambiguous.

At machine learning based response generation 124, the enriched query may be used to retrieve relevant context information and may be provided along with such retrieved relevant context information to a machine learning model such as a language processing machine learning model (e.g., the same model as or a different model than that used at query rewriting/history interpretation 122). For example, as described in more detail below with respect to FIG. 3, an embedding of the enriched query may be compared to embeddings of potentially relevant context information (e.g., in one or more data stores) in order to determine context information that is semantically similar to the enriched query, and such identified context information may be provided with the enriched query to a language processing machine learning model with a prompt. In some embodiments, the conversation history data used at query rewriting/history interpretation 122 is also provided as context data to the machine learning model at machine learning based response generation 124.

The prompt provided to the machine learning model at machine learning based response generation 124 may, for example, instruct the machine learning model to generate an answer to the enriched query in view of the associated context information. The prompt may further instruct the machine learning model to determine whether a disambiguation question is warranted based on the enriched query and, if so, to output a disambiguation question. In some cases, the prompt may also instruct the machine learning model to output an indication of whether a topic change is detected in the enriched query as compared to one or more previous queries (e.g., included in the conversation history data). In some aspects, the prompt instructs the machine learning model to output an answer (e.g., a best guess answer) in every case, even if a disambiguation question is also output.

After machine learning based response generation 124, a dynamic, counter and threshold based process may be used to determine whether to provide an answer or a disambiguation question as a response via the user interface, such as based on whether a threshold number of disambiguation questions have already been sequentially provided via the user interface without a detection of a topic change.

At decision 126, a determination is made of whether a disambiguation question was output by the machine learning model at machine learning based response generation 124. If no disambiguation question was output, then operations may proceed to disambiguation question counter reset 132, where a disambiguation question counter is set to 0 (e.g., if it is not already at 0) and to answer selection 134, where the answer output by the machine learning model at machine learning based response generation 124 is selected as the response to user query 102. In such a case, at response building 136, the answer selected at answer selection 134 may be used to populate response 152 to provide to user interface 110 in response to user query 102. However, if a disambiguation question was output, then operations may proceed from decision 126 to decision 128, where a determination is made of whether a topic change was detected (e.g., whether the machine learning model output an indication that a topic change was detected at machine learning based response generation 124).

If a topic change was detected, then operations may proceed from decision 128 to disambiguation question counter reset 140, where the disambiguation question counter is set to 0 (e.g., if it is not already at 0) because a new topic has begun, and to disambiguation question selection 142, where the disambiguation question output by the machine learning model at machine learning based response generation 124 is selected as the response to user query 102. Operations may further proceed to disambiguation question counter incrementing 144, where the disambiguation question counter is incremented (e.g., by 1). In such a case, at response building 136, the disambiguation question selected at disambiguation question selection 142 may be used to populate response 152 to provide to user interface 110 in response to user query 102. However, if a topic change was not detected, then operations may proceed from decision 128 to decision 130, where a determination is made of whether the disambiguation question counter is less than a threshold X.

If the disambiguation question counter is greater than the threshold X, then operations may proceed to disambiguation question counter reset 132, where the disambiguation question counter is set to 0 and to answer selection 134, where the answer (e.g., the best guess answer) output by the machine learning model at machine learning based response generation 124 is selected as the response to user query 102. In such a case, at response building 136, the answer selected at answer selection 134 may be used to populate response 152 to provide to user interface 110 in response to user query 102. Thus, in such a case, the disambiguation process may be exited after X disambiguation questions have been provided to the user without a topic change, where X may be a configurable value, and a best guess answer is provided to the user instead of another disambiguation question. However, if the disambiguation question counter is not greater than the threshold X, then operations may proceed to disambiguation question selection 142, where the disambiguation question output by the machine learning model at machine learning based response generation 124 is selected as the response to user query 102. Operations may further proceed to disambiguation question counter incrementing 144, where the disambiguation question counter is incremented (e.g., by 1). In such a case, at response building 136, the disambiguation question selected at disambiguation question selection 142 may be used to populate response 152 to provide to user interface 110 in response to user query 102.

Response 152 may be displayed via user interface 110. A user may perform one or more actions based on response 152, such as submitting a subsequent request, which may be routed and/or handled in a similar manner to that described with respect to FIG. 1. For example, a subsequent user query may comprise an answer to a disambiguation question, and may be processed by automated response system 120 via query rewriting/history interpretation 122, machine learning based response generation 124, and so on. In such a case, the conversation history data associated with the subsequent user query may include user query 102 and, in some embodiments, response 152, and such conversation history data may be used to rewrite the answer to the disambiguation question to include a version of the original question in user query 102 enriched based on the answer to the disambiguation question.

An example of a screen of user interface 110, including a series of user queries and automatically generated responses according to techniques described herein, is described below with respect to FIG. 4.

Dynamic Query Rewriting

Figure 2:
FIG. 2 is a diagram illustrating an example process for query re-writing and history interpretation related to machine learning based disambiguation in a knowledge aware conversation system, according to certain embodiments.

FIG. 2 is a diagram 200 illustrating an example process for query re-writing and history interpretation related to machine learning based disambiguation in a knowledge aware conversation system, according to certain embodiments. Diagram 200 generally represents functionality that may be performed at query rewriting/history interpretation 122 of FIG. 1, and includes user query 102 of FIG. 1.

A history data retrieval component 220 may retrieve conversation history data 222 from a conversation history data store 230 based on user query 102. For example, conversation history data store 230 may be a database or other data storage entity that stores conversation history data, such as prior user queries (e.g., including prior enriched user queries) and, in some embodiments, associated responses that were generated to the prior user queries using techniques described herein. History data retrieval component 220 may retrieve such related conversation history data for user query 102 based on one or more attributes related to user query 102, such as a conversation identifier, a user identifier, a session identifier, a software tool that is being used to handle user query 102 and/or one or more previous queries (e.g., a software tool associated with language processing machine learning model 240), other types of metadata, and/or the like, such as based on one or more such attributes also being associated with conversation history data 222 in conversation history data store 230. In some cases, a given software tool that is being used to handle automated response generation for a particular query (e.g., user query 102) or queries is associated with particular conversation history data indicating the previous queries and responses handled and/or generated by the software tool, and this history data may be retrieved.

User query 102 and conversation history data 222 may be provided to a language processing machine learning model 240, such as along with a prompt 224. Language processing machine learning model 240 may, for example be a large language model (LLM), such as having a transformer architecture, or may be any suitable type of machine learning model that has been trained to process natural language inputs and generate outputs in natural language form. Language processing machine learning model 140 may have been trained through a machine learning process based on a large corpus of natural language text in order to process natural language inputs and produce outputs that are requested in the natural language inputs.

Prompt 224 may include natural language instructions to reword language processing machine learning model 240 in a context-enriched form based on conversation history data 222, such as instructing language processing machine learning model 240 to identify any ambiguities or imprecisions in user query 102 and to generate an enriched query that resolves such ambiguities or imprecisions based on conversation history data 222.

Language processing machine learning model 240 may output enriched query 250 in response to prompt 224, user query 102, and conversation history data 222. For example, enriched query 250 may be a reworded version of user query 102 that is in a better form to be processed by a machine learning model, such as being worded with more clarity, such as based on information in conversation history data 222 that is not included in user query 102.

Example Machine Learning Based Response Generation

Figure 3:
FIG. 3 is a diagram depicting an example process for machine learning based response generation related to machine learning based disambiguation in a knowledge aware conversation system, according to certain embodiments.

FIG. 3 is a diagram 300 depicting an example process for machine learning based response generation related to machine learning based disambiguation in a knowledge aware conversation system, according to certain embodiments. Diagram 300 generally represents functionality that may be performed at machine learning based response generation 124 of FIG. 1, and includes enriched query 250 of FIG. 2.

Context retrieval component 320 may retrieve context 322 from a context data store 330 based on enriched query 250. For example, context data store 330 may represent one or more databases and/or other data storage entities storing data that is potentially relevant as context data to user queries. Retrieving relevant context data to provide with a query to a machine learning model may generally be referred to as retrieval augmented generation (RAG). While conventional RAG systems rely on language similarity to select the most relevant context information for a given query, embodiments of the present disclosure improve upon such techniques by enabling retrieval of a more relevant and focused context data set through generation and use of a reworded enriched query that resolves ambiguities in the original query.

Context information stored in context data store 330 and retrieved by context retrieval component 320 as context 322 may include, for example, user attributes, device attributes, application attributes, application history data, instructions, explanatory information, definitions, help content, articles, documents, forms, and/or the like. In one particular example, enriched query 250 includes a request for certain information (from one or more data sources), and the relevant context 322 includes information such as how long the user has been using the computing application, the user's profile information such as username, the user's occupation and/or experience level, known interests of the user, the application version being used, the type and/or version of the device from which the user is accessing user interface 110 of FIG. 1, the operating system (OS) running on the device, the user's clickstream data indicating prior actions with the application, data related to past requests of the user and/or results of handling those requests, state machine(s) related to ongoing processing with the application, past documents, forms, and/or other information provided by the user and/or retrieved in connection with the user, information about application features, help content, and/or the like.

In some aspects, context retrieval component 320 may use an embedding of enriched query 250 and embeddings of context data stored in context data store 330 to determine which context data is relevant to enriched query 250. An embedding of enriched query 250 may be output by language processing machine learning model 240 of FIG. 1 and/or may be generated by context retrieval component 320 or another component, such as using an embedding model. An embedding generally refers to a vector representation of an entity that represents the entity as a vector in n-dimensional space such that similar entities are represented by vectors that are close to one another in the n-dimensional space. Embeddings may be generated through the use of an embedding model, such as a neural network or other type of machine learning model that learns a representation (embedding) for an entity through a training process that trains the neural network based on a data set, such as a plurality of features of a plurality of entities. In one example, an embedding model used to generate an embedding of enriched query 150 and/or embeddings of context information in context data store 330 comprises a Bidirectional Encoder Representations from Transformer (BERT) model, which involves the use of masked language modeling to determine embeddings. In a particular example, the embedding model comprises a Sentence-BERT model. In other embodiments, the embedding model may involve embedding techniques such as Word2Vec and GloVe embeddings. These are included as examples, and other techniques for generating embeddings are possible.

For example, context retrieval component 320 may search context data store 330 for context information that is semantically similar to enriched query 250 based on a similarity measure such as cosine similarity, Euclidean distance, and/or the like between an embedding of enriched query 250 and embeddings of context information stored in context data store 330. Two embeddings may be determined to be a match (e.g., semantically similar to one another) if a similarity measure between the two embeddings exceeds a threshold. For example, context 322 may represent context information from context data store 330 that is semantically similar to enriched query 250 and/or that is otherwise determined by context retrieval component 320 to be related to enriched query 250. Context 322 may include less than all context information that is stored in context data store 330 and may also include less than all potentially relevant context information that is stored in context data store 330 (e.g., where potentially relevant context information may include all context information that is connected in some way to the user query).

Enriched query 250 and context 322 may be provided to a language processing machine learning model 340, such as along with a prompt 310. Conversation history data 222 of FIG. 2 may also be provided to language processing machine learning model 340. In some embodiments language processing machine learning model 340 may be the same model as language processing machine learning model 240 of FIG. 2, while in other embodiments language processing machine learning model 340 may be a different model than language processing machine learning model 240 of FIG. 2. Language processing machine learning model 340 may, for example be a large language model (LLM), such as having a transformer architecture, or may be any suitable type of machine learning model that has been trained to process natural language inputs and generate outputs in natural language form. Language processing machine learning model 340 may have been trained through a machine learning process based on a large corpus of natural language text in order to process natural language inputs and produce outputs that are requested in the natural language inputs.

Prompt 310 may include natural language instructions to generate an answer to enriched query 250 in view of context 322 (and, in some embodiments, in view of conversation history data 222), to determine whether there are any ambiguities in enriched query 250 (e.g., that are not clarified by context 322 and/or conversation history data 222), to generate a disambiguation question if an ambiguity is detected, to determine whether a change of topic is detected in enriched query 250 as compared to one or more previous queries (e.g., included in conversation history data 222), to output an indication of whether a topic change is detected, and/or the like. In some cases, prompt 310 instructs language processing machine learning model 340 to output an answer 342 even if ambiguity is detected and a disambiguation question 344 is also output.

In response, language processing machine learning model 340 may output answer 342, and may also output disambiguation question 344 and/or a topic change indicator 346. For example, answer 342 may represent a natural language answer to enriched query 250. If a disambiguation question 344 is also output, then answer 342 may represent a best guess answer to enriched query 250 despite any ambiguity. Disambiguation question 344 may represent a natural language question that is designed to resolve an ambiguity that language processing machine learning model 340 detected in enriched query 250. Topic change indicator 346 may indicate (e.g., via a binary value or otherwise) whether language processing machine learning model 340 detected a change of topic in enriched query 250 relative to a previous query (e.g., a most recent previous enriched query in conversation history data 222).

As described above with respect to FIG. 1, the outputs from language processing machine learning model 340 may be used to determine a response to display via a user interface. The response may include, for example, answer 342 or disambiguation question 344, such as based on a disambiguation question counter and/or topic change indicator 346.

Aspects of the present disclosure enable accurate results to be obtained despite ambiguities and/or inaccuracies in an original query. For example, if a user query relates to a graph query language (GraphQL) schema based tool, there are many opportunities for ambiguity to present in the user query. A user query that requests which field to use to retrieve a user's email address from a GraphQL schema, for instance, could potentially relate to the user's billing email address, marketing email address, organization email address, identity email address, or the like. If the user query is ambiguous about which of these different types of email addresses is being referred to, techniques described herein may enable such a query to be automatically reworded based on conversation history data using machine learning, resulting in an enriched query that resolves the ambiguity (e.g., specifying which particular email address is being referred to). The enriched query may then be used to retrieve relevant context information for that particular email address, and the relevant context information may be provided with the enriched query to a language processing machine learning model for use in generating an accurate answer to the user query despite the original ambiguity. Further, counters, thresholds, topic change indicators, and/or the like may be used to dynamically avoid disambiguation loops in cases where a disambiguation question is output by the language processing machine learning model for resolution of ambiguity detected in the enriched query. Accordingly, techniques described herein produce a robust, dynamic, resource-efficient, and highly accurate automated response system that overcomes various technical challenges present in prior automated response systems.

Example User Interface Screen

FIG. 4 is a diagram depicting an example user interface screen 400 related to machine learning based disambiguation in a knowledge aware conversation system, according to certain embodiments. For example, user interface screen 400 may represent a screen of user interface 110 of FIG. 1 that displays a series of user queries and responses, such as including user query 102 and response 152 of FIG. 1.

In one example, user interface screen 400 represents a screen of an automated support system by which an individual (e.g., a technical support professional) requests automated support related to one or more aspects of a software application (e.g., in connection with helping a user resolve an issue related to use of the software application).

In user interface screen 400, a first user query 412 includes the natural language question "How long has Peter Gerard been a user of FastFinance?" For instance, user query 412 may have been input via a control on user interface screen 400 (and/or via some other input method) and may represent a request related to assisting an end user named Peter Gerard with use of a software application named FastFinance.

A first response 414 (e.g., a response to user query 412) includes the natural language text "Peter Gerard has been a user of FastFinance for 11 months." For example, an enriched version of user query 412 may have been generated and used to retrieve relevant context information, and the retrieved context information may have been provided along with the enriched query to a machine learning model with a prompt to generate an answer. Response 414 may represent an automatically generated answer to the enriched query (e.g., no ambiguity may have been detected).

A second user query 416 includes the natural language question "What is Peter Gerard's username?" In some cases, a language processing machine learning model (e.g., language processing machine learning model 240 of FIG. 2)

may generate an enriched version of user query 416 that is based on conversation history data (e.g., including user query 412 and response 414), such as including the disambiguated text "What is Peter Gerard's FastFinance username?" This is because the original user query 416 does not specify the application for which Peter Gerard's username is being requested, and there may be multiple applications associated with the automated response system. Thus, because the previous user query 412 in the conversation history data indicates that the conversation relates to the application FastFinance, the language processing machine learning model may determine that user query 416 also relates to the application FastFinance, and may generate the enriched query accordingly. Response 418 may represent an automatically generated answer to the enriched version of user query 416 (e.g., no ambiguity may have been detected in the enriched query).

A third user query 420 includes the natural language question "What is Peter Gerard's employer's tax ID?" An enriched query may be generated based on user query 420, but the enriched query may still include an ambiguity, as Peter Gerard may have multiple employers and the conversation history data does not indicate which particular employer's tax ID is being requested. Thus, a language processing machine learning model (e.g., language processing machine learning model 340 of FIG. 3) may output a disambiguation question based on the enriched query, such as including the text "Are you asking about ABC Tech or Robins Self Storage?" For example, the language processing machine learning model may determine based on context information included with the enriched query that Peter Gerard has two employers named ABC Tech and Robins Self Storage, and may generate the disambiguation question based on this context information. Response 422 may represent the disambiguation question that was generated in response to the enriched version of user query 420.

A fourth user query 424 includes the natural language text "ABC Tech." For example, user query 424 may represent an answer to the disambiguation question included in response 422. User query 424 may be used to generate an enriched query in view of the conversation history data. For example, the enriched query may include the text "What is the tax ID of Peter Gerard's employer ABC Tech?" based on previous user query 420 and user query 424. The enriched query may be used (e.g., by language processing machine learning model 340 of FIG. 3) to generate an answer including the text "Peter Gerard's employer ABC Tech has a tax ID of 52431," which may be displayed as response 426 via user interface 400.

Thus, techniques described herein enable dynamic automated disambiguation of user queries for automated response generation in an accurate and efficient manner.
Example Operations for Machine Learning Based Disambiguation in a Knowledge Aware Conversation System FIG. 5 depicts example operations 500 related to machine learning based disambiguation in a knowledge aware conversation system, according to certain embodiments. For example, operations 500 may be performed by one or more components described above with respect to FIGS. 1-4, system 600 of FIG. 6 (described below), and/or one or more other components and/or devices.

Operations 500 begin at step 502, with receiving a query via a user interface.

Operations 500 continue at step 504, with generating an enriched query by rewording the query based on conversation history data associated with the query.

Operations 500 continue at step 506, with retrieving relevant information from a data store based on using an embedding of the enriched query to perform a semantic search.

Operations 500 continue at step 508, with providing the enriched query and the relevant information to a language processing machine learning model along with a prompt that instructs the language processing machine learning model to generate an answer to the enriched query based on the relevant information and to generate a disambiguation question if one or more conditions are met.

Operations 500 continue at step 510, with receiving an output from the language processing machine learning model in response to the prompt.

Operations 500 continue at step 512, with providing a response to the query via the user interface based on the output.

In some embodiments, the output comprises the disambiguation question, and wherein the method further comprises: providing the disambiguation question via the user interface; receiving disambiguation information via the user interface in response to the disambiguation question; and generating the response based on the disambiguation information.

In certain embodiments, the generating of the response based on the disambiguation information comprises: generating a disambiguated enriched query by rewording the disambiguation information based on corresponding conversation history data associated with the disambiguation information, wherein the corresponding conversation history data includes the enriched query; retrieving corresponding relevant information from the data store based on using a corresponding embedding of the disambiguated enriched query to perform a corresponding semantic search; providing the disambiguated enriched query and the corresponding relevant information to the language processing machine learning model along with a corresponding prompt that instructs the language processing machine learning model to generate a corresponding answer to the disambiguated enriched query based on the corresponding relevant information and to generate a corresponding disambiguation question if the one or more conditions are met; receiving a corresponding output from the language processing machine learning model in response to the corresponding prompt, wherein the response is based on the corresponding output.

Some embodiments further comprise determining whether a disambiguation question counter has exceeded a threshold, wherein the response is based on the determining whether the disambiguation question counter has exceeded the threshold.

Certain embodiments further comprise providing the conversation history data to the language processing machine learning model with the enriched query, the relevant information, and the prompt.

In some embodiments, the prompt further instructs the language processing machine learning model to determine whether the enriched query includes a change of topic relative to a previous enriched query included in the conversation history data, wherein the output indicates whether the enriched query includes a topic change relative to the previous enriched query Certain embodiments further comprise determining, based on whether the output indicates that the enriched query includes the topic change relative to the previous enriched query, whether to exit a disambiguation process or whether to reset a disambiguation question counter.

In some embodiments, the generating of the enriched query by rewording the query based on the conversation history data associated with the query comprises using the language processing machine learning model or a different language processing machine learning model to generate the enriched query.

In certain embodiments, the generating of the enriched query by rewording the query based on the conversation history data associated with the query comprises extracting relevant contextual information from the conversation history data using the language processing machine learning model or the different language processing machine learning model, wherein the language processing machine learning model or the different language processing machine learning model uses the extracted relevant contextual information to reword the query.

Some embodiments further comprise determining the conversation history data based on a software tool associated with the language processing machine learning model.

Notably, method 500 is just one example with a selection of example steps, but additional methods with more, fewer, and/or different steps are possible based on the disclosure herein.

Example Computing System

Figure 6:
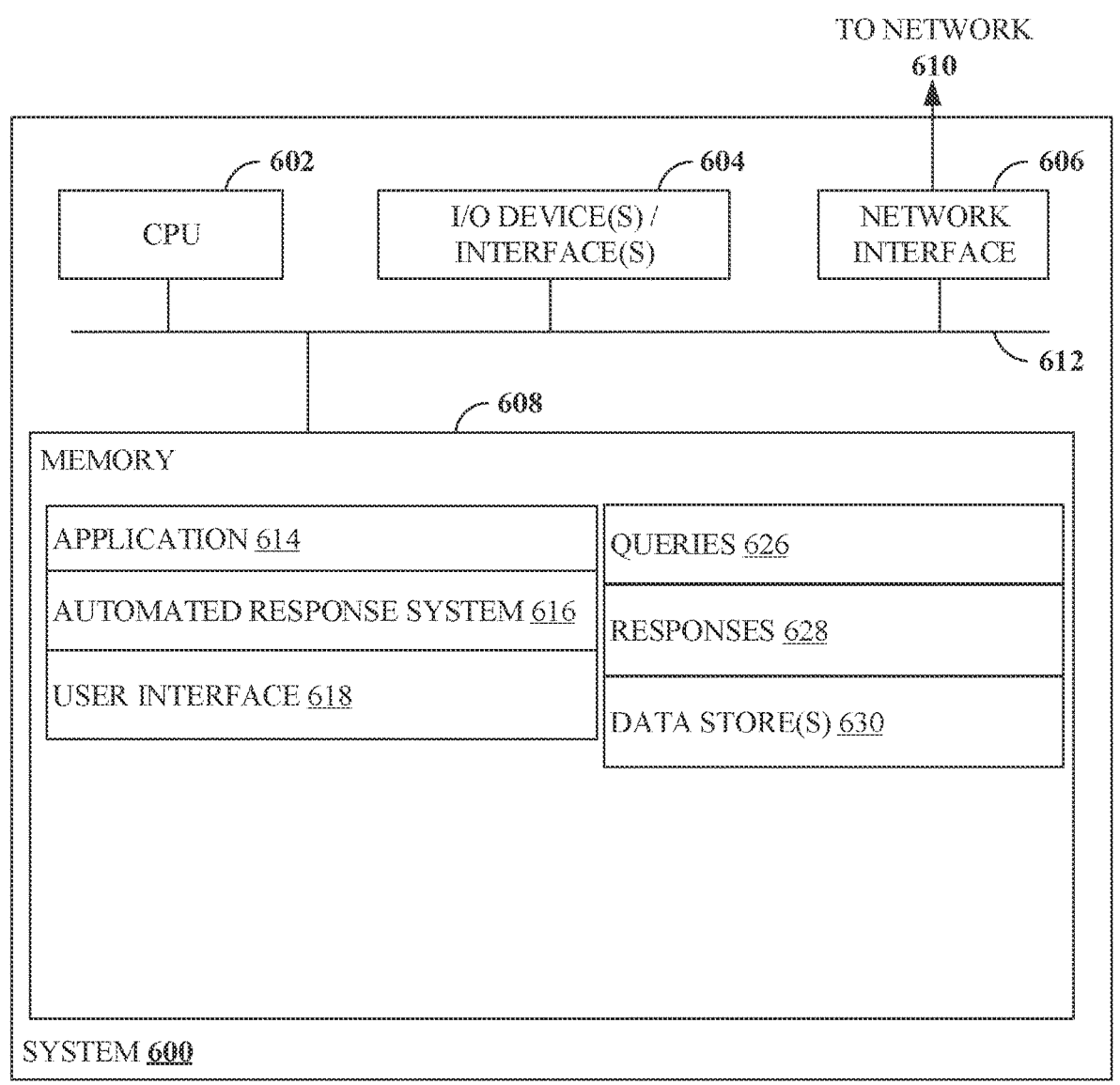
FIG. 6 depicts an example processing system for machine learning based disambiguation in a knowledge aware conversation system, according to certain embodiments.

FIG. 6 illustrates an example computing system 600 with which embodiments of the disclosure related to machine learning based disambiguation in a knowledge aware conversation system may be implemented. For example, the computing system 600 may perform functionality described above with respect to FIGS. 1-4, and/or may perform operations 500 of FIG. 5.

The computing system 600 includes a central processing unit (CPU) 602, one or more I/O device interfaces 604 that may allow for the connection of various I/O devices 604 (e.g., keyboards, displays, mouse devices, pen input, etc.) to the computing system 600, a network interface 606, a memory 608, and an interconnect 612. It is contemplated that one or more components of the computing system 600 may be located remotely and accessed via a network 610. It is further contemplated that one or more components of the computing system 600 may include physical components or virtualized components.

The CPU 602 may retrieve and execute programming instructions stored in the memory 608. Similarly, the CPU 602 may retrieve and store application data residing in the memory 608. The interconnect 612 transmits programming instructions and application data, among the CPU 602, the I/O device interface 604, the network interface 606, the memory 608. The CPU 602 is included to be representative of a single CPU, multiple CPUs, a single CPU having multiple processing cores, and other arrangements.

Additionally, the memory 608 is included to be representative of a random access memory or the like. In some embodiments, the memory 608 may include a disk drive, solid state drive, or a collection of storage devices distributed across multiple storage systems. Although shown as a single unit, the memory 608 may be a combination of fixed and/or removable storage devices, such as fixed disc drives, removable memory cards or optical storage, network attached storage (NAS), or a storage area-network (SAN).

As shown, the memory 608 includes an application 614 which may be representative of a computing application that provides functionality described herein related to machine learning based disambiguation in a knowledge aware conversation system, such as an application associated with user interface 618 by which users may submit requests and receive responses that are automatically generated according to techniques described herein. Memory 608 further includes automated response system 616 and user interface 618, which may be generally representative of automated response system 120 and user interface 110 of FIG. 1.

Memory 608 further includes queries 626, which may include user query 102 of FIG. 1, enriched query 250 of FIGS. 2 and 3, and/or queries 412, 416, 420, and/or 424 of FIG. 4. Memory 508 further includes tools 524, which may include tool 310 and fallback tool 350 of FIG. 3. Memory 608 further includes responses 628, which may include response 152 of FIG. 1, answer 342 of disambiguation question 344 of FIG. 3, and/or responses 414, 418, 422, and/or 426 of FIG. 4.

Memory 608 further includes data store(s) 630, which may include conversation history data store 230 of FIG. 2 and/or context data store 330 of FIG. 3.

It is noted that system 600 is included as an example, and certain functionality described with respect to system 600 and/or otherwise described herein may be implemented via more or fewer devices and/or components.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for machine learning based disambiguation in a knowledge aware conversation system, comprising:

receiving a query via a user interface;

providing, as inputs to a given language processing machine learning model:

the query;

conversation history data associated with the query; and a prompt instructing the given language processing machine learning model to generate an enriched query by rewording the query based on conversation history data;

generating, by the given language processing machine learning model based on the the inputs, the enriched query, wherein the generating of the enriched query comprises extracting relevant contextual information from the conversation history data using the given language processing machine learning model, wherein the given language processing machine learning model uses the extracted relevant contextual information to reword the query;

retrieving relevant information from a data store based on using an embedding of the enriched query to perform a semantic search;

providing the enriched query and the relevant information to a language processing machine learning model along with a given prompt that instructs the language processing machine learning model to;

generate an answer to the enriched query based on the relevant information if the language processing machine learning model detects no ambiguity in the enriched query; and generate a disambiguation question if the language processing machine learning model detects an ambiguity in the enriched query;

receiving an output from the language processing machine learning model in response to the given prompt, wherein the output comprises the answer or the disambiguation question; and providing a response to the query via the user interface based on the output.

2. The method of claim 1, wherein the output comprises the disambiguation question, and wherein the method further comprises:

providing the disambiguation question via the user interface;

receiving disambiguation information via the user interface in response to the disambiguation question; and generating the response based on the disambiguation information.

3. The method of claim 2, wherein the generating of the response based on the disambiguation information comprises:

generating a disambiguated enriched query by rewording the disambiguation information based on corresponding conversation history data associated with the disambiguation information, wherein the corresponding conversation history data includes the enriched query;

retrieving corresponding relevant information from the data store based on using a corresponding embedding of the disambiguated enriched query to perform a corresponding semantic search;

providing the disambiguated enriched query and the corresponding relevant information to the language processing machine learning model along with a corresponding prompt that instructs the language processing machine learning model to generate a corresponding answer to the disambiguated enriched query based on the corresponding relevant information and to generate a corresponding disambiguation question if the language processing machine learning model detects a corresponding ambiguity in the disambiguated enriched query; and receiving a corresponding output from the language processing machine learning model in response to the corresponding prompt, wherein the response is based on the corresponding output.

4. The method of claim 3, further comprising determining whether a disambiguation question counter has exceeded a threshold, wherein the response is based on the determining whether the disambiguation question counter has exceeded the threshold.

5. The method of claim 1, further comprising providing the conversation history data to the language processing machine learning model with the enriched query, the relevant information, and the given prompt.

6. The method of claim 5, wherein the given prompt further instructs the language processing machine learning model to determine whether the enriched query includes a change of topic relative to a previous enriched query included in the conversation history data, wherein the output indicates whether the enriched query includes a topic change relative to the previous enriched query.

7. The method of claim 6, further comprising determining, based on whether the output indicates that the enriched query includes the topic change relative to the previous enriched query, whether to exit a disambiguation process or whether to reset a disambiguation question counter.

8. A system for machine learning based disambiguation in a knowledge aware conversation system, comprising:

one or more processors; and a memory comprising instructions that, when executed by the one or more processors, cause the system to:

receive a query via a user interface;

provide, as inputs to a given language processing machine learning model:

the query;

conversation history data associated with the query; and a prompt instructing the given language processing machine learning model to generate an enriched query by rewording the query based on conversation history data;

generate, by the given language processing machine learning model based on the inputs, the enriched query, wherein the generating of the enriched query comprises extracting relevant contextual information from the conversation history data using the given language processing machine learning model, wherein the given language processing machine learning model uses the extracted relevant contextual information to reword the query;

retrieve relevant information from a data store based on using an embedding of the enriched query to perform a semantic search;

provide the enriched query and the relevant information to a language processing machine learning model along with a given prompt that instructs the language processing machine learning model to:

generate an answer to the enriched query based on the relevant information if the language processing machine learning model detects no ambiguity in the enriched query; and generate a disambiguation question if the language processing machine learning model detects an ambiguity in the enriched query;

receive an output from the language processing machine learning model in response to the given prompt, wherein the output comprises the answer or the disambiguation question; and provide a response to the query via the user interface based on the output.

9. The system of claim 8, wherein the output comprises the disambiguation question, and wherein the instructions, when executed by the one or more processors, further cause the system to:

provide the disambiguation question via the user interface;

receive disambiguation information via the user interface in response to the disambiguation question; and generate the response based on the disambiguation information.

10. The system of claim 9, wherein the generating of the response based on the disambiguation information comprises:

generating a disambiguated enriched query by rewording the disambiguation information based on corresponding conversation history data associated with the disambiguation information, wherein the corresponding conversation history data includes the enriched query;

retrieving corresponding relevant information from the data store based on using a corresponding embedding of the disambiguated enriched query to perform a corresponding semantic search;

providing the disambiguated enriched query and the corresponding relevant information to the language processing machine learning model along with a corresponding prompt that instructs the language processing machine learning model to generate a corresponding answer to the disambiguated enriched query based on the corresponding relevant information and to generate a corresponding disambiguation question if the language processing machine learning model detects a corresponding ambiguity in the disambiguated enriched query; and receiving a corresponding output from the language processing machine learning model in response to the corresponding prompt, wherein the response is based on the corresponding output.

11. The system of claim 10, wherein the instructions, when executed by the one or more processors, further cause the system to determine whether a disambiguation question counter has exceeded a threshold, wherein the response is based on the determining whether the disambiguation question counter has exceeded the threshold.

12. The system of claim 8, wherein the instructions, when executed by the one or more processors, further cause the system to provide the conversation history data to the language processing machine learning model with the enriched query, the relevant information, and the given prompt.

13. The system of claim 12, wherein the given prompt further instructs the language processing machine learning model to determine whether the enriched query includes a change of topic relative to a previous enriched query included in the conversation history data, wherein the output indicates whether the enriched query includes a topic change relative to the previous enriched query.

14. The system of claim 13, wherein the instructions, when executed by the one or more processors, further cause the system to determine, based on whether the output indicates that the enriched query includes the topic change relative to the previous enriched query, whether to exit a disambiguation process or whether to reset a disambiguation question counter.

15. A non-transitory computer readable medium comprising instructions that, when executed by one or more processors of a computing system, cause the computing system to:

receive a query via a user interface;

provide, as inputs to a given language processing machine learning model:

the query;

conversation history data associated with the query; and a prompt instructing the given language processing machine learning model to generate an enriched query by rewording the query based on the conversation history data;

generate, by the given language processing machine learning model based on the inputs, the enriched query, wherein the generating of the enriched query comprises extracting relevant contextual information from the conversation history data using the given language processing machine learning model, wherein the given language processing machine learning model uses the extracted relevant contextual information to reword the query;

retrieve relevant information from a data store based on using an embedding of the enriched query to perform a semantic search;

provide the enriched query and the relevant information to a language processing machine learning model along with a given prompt that instructs the language processing machine learning model to:

generate an answer to the enriched query based on the relevant information if the language processing machine learning model detects no ambiguity in the enriched query; and generate a disambiguation question if the language processing machine learning model detects an ambiguity in the enriched query;

receive an output from the language processing machine learning model in response to the given prompt, wherein the output comprises the answer or the disambiguation question; and provide a response to the query via the user interface based on the output.

* * * * *